US006962529B2

(12) United States Patent
Kusuda

(10) Patent No.: US 6,962,529 B2
(45) Date of Patent: Nov. 8, 2005

(54) NETWORK GAME UNIT, GAME SYSTEM, AND RECORDING MEDIUM

(75) Inventor: Kazuhiro Kusuda, Tokyo (JP)

(73) Assignee: Konami Corporation, Tokyo (JP)

( * ) Notice: Subject to any disclaimer, the term of this patent is extended or adjusted under 35 U.S.C. 154(b) by 463 days.

(21) Appl. No.: 09/910,070

(22) Filed: Jul. 23, 2001

(65) Prior Publication Data

US 2002/0010024 A1 Jan. 24, 2002

(30) Foreign Application Priority Data

Jul. 21, 2000 (JP) ................................. P.2000-220804

(51) Int. Cl.$^7$ ........................... A63F 13/10; A63F 13/12
(52) U.S. Cl. ........................................ 463/29; 463/42
(58) Field of Search ............................. 463/29, 40–42

(56) References Cited

U.S. PATENT DOCUMENTS 5,779,549 A * 7/1998 Walker et al. ................ 463/42
6,322,451 B1 * 11/2001 Miura ......................... 463/42

FOREIGN PATENT DOCUMENTS

| JP | 8-829 A | 1/1996 |
|----|---------|--------|
| JP | 10-198611 A | 7/1998 |
| JP | 11-168581 A | 6/1999 |
| JP | 11-253657 A | 9/1999 |
| JP | 2000-116956 A | 4/2000 |

* cited by examiner

Primary Examiner—Andrew M. Dolinar
(74) Attorney, Agent, or Firm—Sughrue Mion, PLLC

(57) ABSTRACT

In a game system, players' own horse trained by players in a horse racing game of an arcade game machine is allowed to participate in races of a horse racing game Web site managed by a Web server by using a password. The password includes a day of retirement, names of G1 races won, and so on. In the horse racing game Web site, if the day of retirement is within a term of validity, participation for an application related to the password is not allowed. Experience of winning a predetermined number of G1 race is required in order to participate in a specific race held in the horse racing game site, and horses without such experience are not allowed to participate.

12 Claims, 17 Drawing Sheets

FIG. 9

DISTINGUISHED HORSE : * * * BRIAN
PASSWORD

ASAKIYONI  OKATARAHA  ENNTOKINO
KIYAYUOHI  UKIOMERI   MASOYUCHIKU

If you have this password, you can participate in the "Internet Grand Prix" held on the Konami homepage.

Homepage address          http://www.konami.co.jp

FIG. 11

GM RACETRACK

GM Racetrack, the place where horses of achievement compete with each other at the top level nationally. Which horse is the real champion in japan?

WATCHING RACE

You can watch horseraces held at the GM racetrack. Races are held at 24:00 every Friday!

THIS WEEK'S SCHEDULE

You can browse this week's race schedule and profiles of participating horses.
5 races are held every week!

LAST WEEK'S RESULTS

You can browse the results of last week's races.

For participants in the Internet Grand Prix
For playing this game, you have to obtain a password of a distinguished horse by training an excellent horse in arcade game machines installed in arcades all over Japan.

| RACE ENTRY | For players who have already completed owner registration, please click here. |
| OWNER REGISTRATION | For players who will participate in this game, please click here. |

Next race will be held on Friday, 7th of December

(b)

Input required items and then please click "send" button.

E-mail address for comunication: 123@45678
Owner's name: ○○ (up to ** characters)
Password: **** (up to  characters)

[SEND]

(c)

Confirm registered information

Owner's name: ○○
Password: ******

[SEND]

(d)

Registered information has been confirmed.
Mr.**'s results in Internet Grand Prix
Prize money : 1352 million yen   Total result : 5 wins out of 21 races
Ranking : 23rd out of 1289 players ▼ Races won

| Cherry Blossom Award | Satsuki Award | ... | The Emperor Award | NHK Cup | Takamatsunomiya Record | Oaks | Derby | Yasuda Memorial | Takarazuka Memorial | Autumn Cup | The Emperor Award | Chrysanthemum Blossom Award | Elizabeth Award | Mile Cup | Japan Cup | Hanshin Award | Asahi Cup | Spring Stakes | Arima Memorial |

7 horses are currently registered.    Please click this button to add a new distinguished horse. → [DISTINGUISHED HORSE REGISTRATION]

** Brian                                2/7
Great performance in arcade game machines
G1 races won : Satsuki Award, Emperor Award, Japan Cup, Arima Memorial
Great performance in Internet Grand Prix
Results : 1 win out of 3 races    Prize money won : fifty five million yen
  11/09  Satsuki Award        5th                    two million yen
  11/16  Yasuda Memorial      1st                    five million yen
  11/30  The Emperor's Award (spring)  12th          three million yen

[PREVIOUS]  [NEXT]

(e)

Please click the "send" button after inputting distinguished horse password

Distinguished horse password : bankureha sukuwatatsu hoketokete aimadan hihirotuno sefunakoru

[ENTER]  Please click here to have a this horse participate.

[SEND]

(f)

Which race do you want to participate in? (Select one.)

○ Oaks
○ Derby
○ Yasuda Memorial
○ Takarazuka Memorial
○ Shuuka Award

Races you can enter depend upon number of lifetime medals won or G1 races won in the arcade game machine.

[SEND]

FIG. 14

RACE WATCHING  NEXT RACE IS SATSUKI AWARD

SATSUKI AWARD  FRIDAY 7TH OF DECEMBER  WINNER'S PRIZE MONEY: FIFTY MILLION YEN
SCHEDULED TO START 24:02

| | HORSE NAME | OWNERS | PREDIC-TION | ACHIEVEMENT RESULTS | WINNING RATE | NUMBER OF G1 WINS | COMMENTS | ODDS |
|---|---|---|---|---|---|---|---|---|
| 1 | ** Brian | Kusuda | ◎ | 28-8 | .286 | 7 wins | best condition | 5.6 |
| 2 | Stakoravich | Tomaru | | 12-7 | .583 | 5 wins | good mood | 10.5 |
| 3 | ** Prince | Konami | ◎◯ | 17-8 | .471 | 3 wins | maybe also-ran | 13.5 |
| 4 | Ray Fortune | Ray | ◎◎◯ | 8-4 | .500 | 3 wins | most popular | 4.2 |
| 5 | Lucky Silence | Lucky | | 10-4 | .400 | 2 wins | improving getting in condition | 24.9 |
| 6 | Casino Symbol | Ando | ✕▲ | 24-12 | .500 | 3 wins | light motion | 35.6 |
| 7 | G1 Classic | Yoshida | △✕ | 32-8 | .250 | 5 wins | first race | 12.8 |
| 8 | Neo Alpha | Neo | | 28-8 | .286 | 6 wins | stalker | 86.3 |
| 9 | Simity Typhoon | Simity | | 16-3 | .188 | 3 wins | within fifth | 65.0 |
| 10 | Micky Lyden | Micky | ◯△ | 27-5 | .185 | 7 wins | place | 6.9 |
| 11 | Kinkin Special | Kinkin | | 28-8 | .286 | 3 wins | first race | 58.3 |
| 12 | Nissay Glorious | Nissay | | 21-9 | .429 | 2 wins | first race | 18.6 |
| 13 | Nomino Heart | Sasaki | | 28-13 | .464 | 5 wins | good mood | 8.0 |
| 14 | Black Great | Black | ▲△▲ | 11-5 | .455 | 3 wins | won last 2 races | 23.6 |

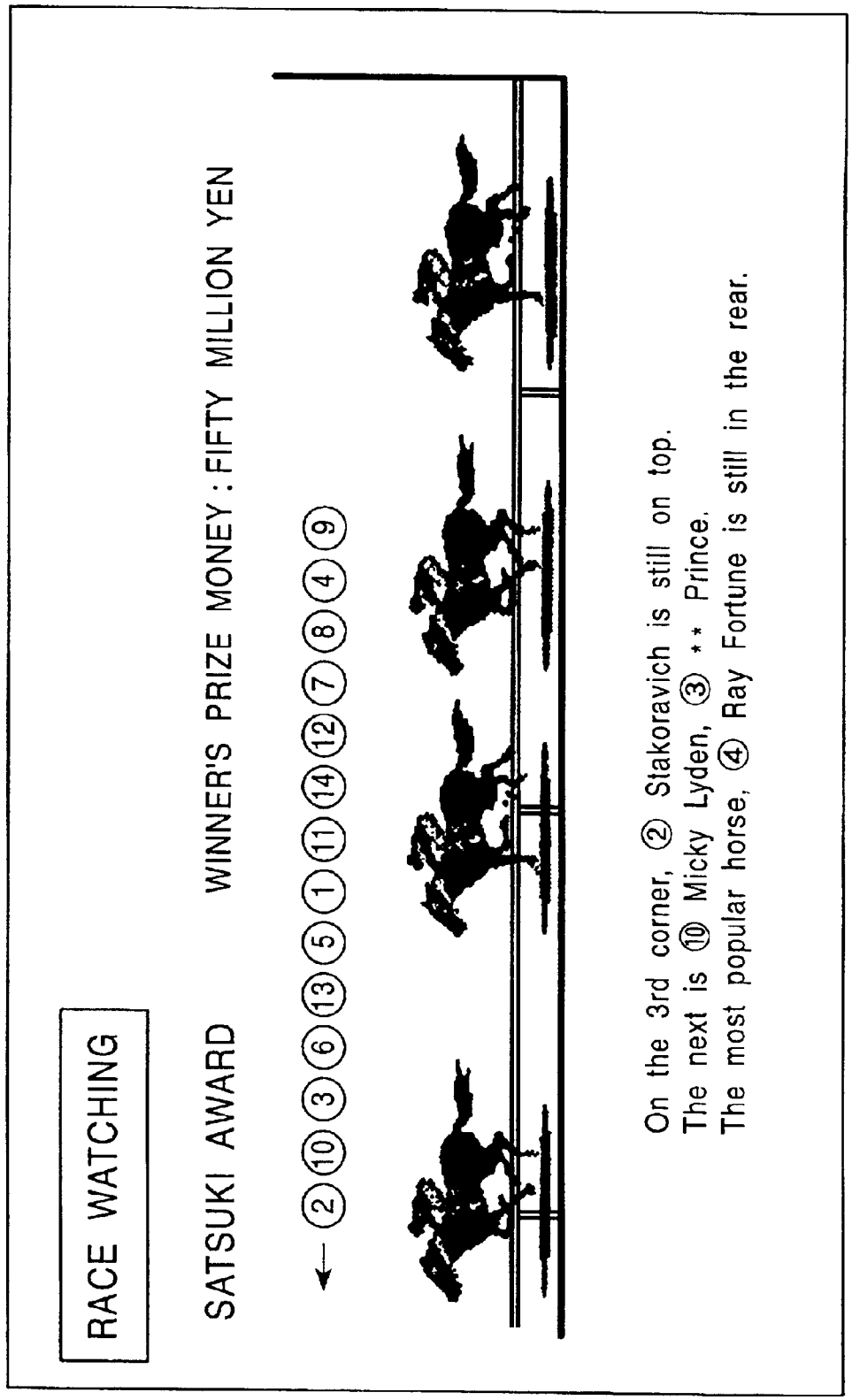

FIG. 16

LAST WEEK'S RESULTS    FRIDAY 7TH DECEMBER

FRIDAY 7TH DECEMBER    SECOND RACE    RESULT OF SATSUKI AWARD

| PLACE | HORSE NUMBER | HORSE NAME | GAP TO THE NEXT | PRIZE MONEY |
|---|---|---|---|---|
| WINNER | ① | ＊＊ Bryan | | 50 MILLION YEN |
| 2ND PLACE | ⑬ | Nomino Heart | 5 | 20 MILLION YEN |
| THIRD | ⑩ | Micky Raiden | HEAD | 12.5 MILLION YEN |
| FOURTH | ② | Stakoravitch | NOSE | 7.5 MILLION YEN |
| FIFTH | ⑤ | Lucky Silence | NECK | 5 MILLION YEN |

PREVIOUS RACE                                NEXT RACE

NETWORK GAME UNIT, GAME SYSTEM, AND RECORDING MEDIUM

BACKGROUND OF THE INVENTION

1. Field of the Invention

The present invention relates to a network game machine connected via a network to a plurality of client machines and running a network game wherein a plurality of players using the client machines can participate. Further, the present invention relates to a game system having the network game machine. Furthermore, the present invention relates to a recording medium, such as a computer readable medium, having recorded thereon a processing program for operating the network game machine and computers which the network game machine comprises.

The present application is based on Japanese Patent Application No. 2000-220804, which is incorporated herein by reference.

2. Description of the Related Art

With the recent rapid development of network technology, the public is able to access various Web sites and make use of them. It is becoming possible to play network games wherein a plurality of players can participate from such Web sites. Network games of this kind are considered to become widely prevalent in the future along with the establishment of communication infrastructures with high capacity and high speed, which can realize complex and advanced game contents.

Furthermore, the advantages of network games of this kind in comparison with arcade games or home games are that it is possible to play the same game with players at separate locations. In network games having this advantage, it could be considered to be possible for a plurality of players to participate in the same game so that, for example, competing with other players at separate locations or cooperating with each other to complete the game is possible.

Depending on the contents of the network game, the number of participating players could be limited or the number of participating characters used by the players could be limited. For example, considering a horse racing simulation game as an example of a network game, the number of participating horses in one race is limited to about eighteen. Thus, the number of participating characters in one race used by players as their own horses proves to be limited to about eighteen. Moreover, the number of players who can participate using their own horses proves to be limited to a maximum of eighteen even if each player uses only one of his of her own horses.

Not only in the horse racing simulation games but also in network games which limit the number of participants, the number of applications for participation in the game could exceed the limited number of participants. In such cases as this, if all the applications were received and the game were performed, it would become difficult to perform the game, thus detracting from the enjoyment of the network game.

Furthermore, depending on the content of the network games, the enjoyment of the network game could be reduced even if the number of participating players or characters used by the players did not exceed a predetermined number. For example, considering a horse racing simulation game as an example of a network game, the number of participating characters used by the players could be only three in one race. In this case, a race with 3 horses proves to be less exciting, thus detracting from the enjoyment of the network game.

SUMMARY OF THE INVENTION

In light of the background described above, it is an object of the present invention to provide a network games which can maintain their enjoyment by adjusting the number of participating players who want to participate in the network game or participating characters used by the players to a suitable number for the network game, a game system having this network game, and a recording medium, such as a computer readable medium, having recorded thereon a processing program for operating computers which the network game unit comprises.

In order to achieve the above objects, according to a first aspect of the present invention, there is provided a network game unit connected to a plurality of client machines via a network and running a network game in which a plurality of players using the plurality of client machines can participate. The network game unit comprises an application receiving device which receives application for participation in the network game, a participation assessing device which assesses whether or not to allow applications received by the application receiving device to participate in the network game according to predetermined conditions of participation, and a participation process executing device which executes whether to enable players or characters used by the players related to the applications assessed to be allowed to participate by the participation assessing device to participate in the network game.

In the network game unit of the first aspect, when applications from players are received by the application receiving device, it is assessed whether or not the players related to the applications or characters used in network game related to the applications are allowed to participate in the network game by the application assessing device based on participation conditions. For applications which are determined to be allowed to participate, participation process for enabling players related to the applications and so on to participate in the network game are executed by the participation process executing device. Participation Conditions for assessing whether or not applications are allowed to participate depend on the content of the network game, but they may also be conditions which can decrease the number of applications received. In this way, participation of players is rejected or allowed based on predetermined participation conditions so that it is possible to limit the number of participating players in the network game and adjust it to a number suitable for the network game by suitably setting the participation conditions when the number of applications exceeds a predetermined number. The network connecting client machines with network game is not restricted to global network and includes enclosed network wherein communications between only fixed members are allowed and network in limited space such as arcade.

According to a second aspect of the present invention, it is preferable that the participation assessing device allows players or characters used by the players related to the applications to participate in turn, and disallows players or characters used by the players related to applications received after a number of received applications reaches a predetermined number of participants to participate.

In the network game unit of the second aspect, applications are assessed to be allowed to participate in turn. And when the number of received applications exceeds a predetermined number, applications coming later are determined to be denied. In other words, applications received are assessed to be allowed in turn on condition that there are received before the number of received applications reaches a predetermined number of participants.

According to a third aspect of the present invention, it is preferable that the participation assessing device assesses whether or not to allow players or characters used by the players, on condition of participation such as past achievements of players or characters used by the players, to participate.

In the network game unit of the third aspect, participation is conditioned on the past achievements of players who have played the network game or the past achievements of characters used by the players. For example, it is possible that the players with many times of participation are allowed to participate prior to others or characters with many points won are allowed to participate prior to others. The past achievements mean every information obtained in the past play, are not restricted to the times of participations or the points won, and it depends upon the content of the network game. For example, considering a horse racing simulation game as an example of a network game, experiences of winning predetermined G1 races and so on are corresponding to it. In this way, it is possible to provide advantageous participation conditions to enthusiastic players or to equalize the level of players who play together.

According to a fourth aspect of the present invention, the network game unit may further comprise an ability changing device which changes ability of characters used by the players in the network game, wherein the participation assessing device assesses whether or not to allow participation in the network game on condition of participation such as ability of the characters.

In this network game unit of the fourth aspect, ability of characters used by players in the network game could be changed by the ability changing device. For example, considering a horse racing simulation game as an example of a network game, when the times of participation is excess, the age of characters as player's own horse gets older, ability change which decreases ability is made. And it could be possible that ability change which increases ability of player's own horse is made by training it. The character's ability which can be changed is set to be participation conditions. For example, it will be possible to allow only characters with more than predetermined ability to participate or to allow characters with less than predetermined ability to participate. In this way, it is possible to equalize the character's ability.

According to a fifth aspect of the present invention, it is preferable that the participation assessing device assesses whether to allow players or characters used by the players having been disallowed to participate in the network game in the past by the participation assessing device to participate prior to others.

In this network game of the fifth aspect, players who have been disallowed to participate in the network game or characters used by the players are assessed to be allowed to participate prior to others.

According to a sixth aspect of the present invention, the network game unit may further comprise an information receiving device which receives character information which is information related to characters used by the players in other game units, and an achievement information reading device which reads the past achievements of the players who have played in the other network game units or the achievements of the characters from the character information received by the character information receiving device, wherein the participation assessing device assesses whether or not to allow participation in the network game based on the achievement information read by the achievement information reading device.

In this network game unit of the sixth aspect, it assesses whether or not to allow participation based on achievement information included in character information, the information related to characters which are used by players in other game machines such as arcade game machines or home game machines. The achievement information device every information obtained in the past in other game machines and depends on the contents of the other game machines. For example, considering a horse racing simulation game as an example of the other game machine, experiences of winning predetermined race in G1 races prepared therein. In the network game unit according to the sixth aspect of the present invention, it is desirable that the game machine and the network game have relationship with each other because the network game unit make use of achievement information obtained in the other game machines. But they may also have no relationship with each other.

In the network game unit according to the sixth aspect of the present invention, in order to obtain the achievement information, the character information receiving device initially receives character information, the information related to characters which have been used by players in other game machines. And it reads achievement information included in the character information and assesses whether or not to allow participation based on the achievement information. The character information receiving device receives, for example, password of character string type transformed from character information, character information as form of electronic data, or character information inputted from an input device by operator.

According to a seventh aspect of the present invention, the network game unit may further comprise an information receiving device which receives character information which is information related to characters trained by the players in other network game units, and an ability information reading device which reads out ability information of the characters from the character information received by the character information receiving device, wherein the participation assessing device assesses whether or not to allow participation in the network game on condition of participation such as ability information read by the ability information device.

In the network game unit of the seventh aspect, it assesses whether or not to allow participation based on ability information included in character information, the information related to characters trained by players in other game machines. The ability information, considering a horse racing simulation game of trained-type as an example of the other game machines, could be corresponding to speed ability or stamina ability, for example, of player's own horses as characters trained in the games. In the network game unit according to the seventh aspect of the present invention, when ability information is arranged to be used as ability of characters used in the network game, it is possible to equalize the ability of characters participating in the network game. Moreover, the ability information of characters trained in other network game machines should not always be used in the network game.

In the network game unit according to the seventh aspect of the present invention, it receives character information, the information related to characters used by players in other game machines, by the character information receiving device for obtaining the ability information. And it reads the ability information included in the character information and then assesses whether or not to allow participation based on the ability information. The character information is the same as the one according to the sixth aspect of the present invention.

According to an eighth aspect of the present invention, there is provided a network game unit connected to a plurality of client machines via a network and running a network game in which a plurality of players using the plurality of client machines can participate. The network game unit comprises an application receiving device which receives applications for participation in the network game, a participation allowing device which allows players or characters used by the players related to the applications based on applications received by the application receiving device, a preliminary character recording medium which records preliminary characters which are not used by players, and a preliminary character participation enabling device which enables preliminary characters recorded in the preliminary character recording medium to participate in the network game when the number of applications allowed to participate does not reach a predetermined number of participants.

In the network game unit of the eighth aspect, it allows players related to the application or characters used in network game related to application of the players to participate in the network game after receiving applications from the players by an application receiving device. When the number of applications which are allowed to participate does not reach a predetermined number of participants, it enables preliminary characters recorded in a preliminary character recording medium to participate in the network game by way of the preliminary character participation enabling device. In other words, the number of participating characters is filled with the preliminary characters. Players do not use the preliminary character, but they are virtual characters reserved in the network game unit. In this way, it could be possible to adjust the number of participants to a number suitable for the network game, when the number of participants is not sufficient.

According to a ninth aspect of the present invention, there is provided a game system which comprises a game machine running a game using characters used by players, and a network game machine connected to client machines via a network and running a network game which players using the client machines can play using ability information which is information related to ability of characters used in the game machines, wherein the network game machine is the network game unit as defined in either one of the first to eighth aspects of the present invention.

In the game system of the ninth aspect, players can play network games wherein the players can participate via network using the ability information of characters used in the game machines such as arcade game machines and so on. In the network game unit running the network game, it is possible to adjust the number of participants in the network game to a number suitable for the network game, because the network game unit running this network game uses the network game machines according to either one of the first to eighth aspects of the present invention.

According to a tenth aspect of the present invention, there is provided a computer readable medium having recorded thereon a processing program for operating the network game unit according to either one of the first to seventh aspects of the present invention. The computer readable medium comprises a first processing routine for assessing whether or not to allow participation in a network game with respect to an application for the participation in the network game in accordance with predetermined conditions of participation, and a second processing routine for executing a participation process, which enables a player, related to the application allowed in the first processing routine, to participate in the network game, or which enables a character used by the player to participate in the network game.

A processing program recorded in the computer readable medium can limit the number of participating players and adjust it to a number suitable for the network game by being run in computers, which make up network game unit according to the first to seventh aspects of the present invention, even if more applications than a predetermined number of participants are received.

According to an eleventh aspect of the present invention, there is provided a computer readable medium having recorded thereon a processing program for operating the network game unit according to the eighth aspect of the present invention. The computer readable medium comprises a first processing routine for allowing players related to the applications or characters used by the players to participate in a network game based on applications for participation in the network game, and a second processing routine for enabling preliminary characters, which have been recorded in a preliminary character recording medium and have not been used by the players, to participate in the network game when the number of the applications for participation allowed in the first processing routine to participate in the network game is not sufficient to a predetermined number of applications for participation.

The processing program recorded in the computer readable medium can adjust the number of participants to a number suitable for the network game by being run on computers which make up the network game according to the eighth aspect of the present invention and filling with preliminary characters, when the number of participants is not sufficient.

BRIEF DESCRIPTION OF THE DRAWINGS

The above and other objects and advantages of the present invention will become more apparent by describing in detail a preferred embodiment thereof with reference to the accompanying drawings, wherein:

FIG. 9 is a schematic diagram of a password screen displayed on a display device in the arcade game machine;

FIG. 11 is a schematic diagram showing a racetrack page of the horse racing game Web site;

FIG. 12(a) is a schematic diagram showing an initial screen in race entry page of the horse racing game Web site;

FIG. 12(b) is a schematic diagram showing an owner registration screen of the race entry page;

FIG. 12(c) is a schematic diagram showing an entry confirmation screen of the race entry page;

FIG. 12(d) is a schematic diagram showing a race entry screen of the race entry page;

FIG. 12(e) is a schematic diagram showing a player's own horse password input screen of the race entry page;

FIG. 12(f) is a schematic diagram showing a race selection screen of the race entry page;

FIG. 14 is a schematic diagram showing a race information screen displayed on race watching page of the horse racing game Web site just prior to the start of the race;

FIG. 15 is a schematic diagram showing an example of a race screen displayed on the race watching page during the race;

FIG. 16 is a schematic diagram showing a race result display screen displayed on the race watching page just after the end of the race.

DETAILED DESCRIPTION OF THE PREFERRED EMBODIMENT

An embodiment of the present invention now will be described as follows. In the embodiment, the present invention is applied to a Web server working as a network game unit forming a game system which enables players' own horses as characters trained in commercial-use game machine running a trained-type horse racing simulation game (hereinafter referred to as arcade game machine) by players as owners to participate in an Internet horse racing game (hereinafter referred to as "Internet Grand Prix"), which is a network game on horse racing game Web site publically available on the Internet.

Figure 2:
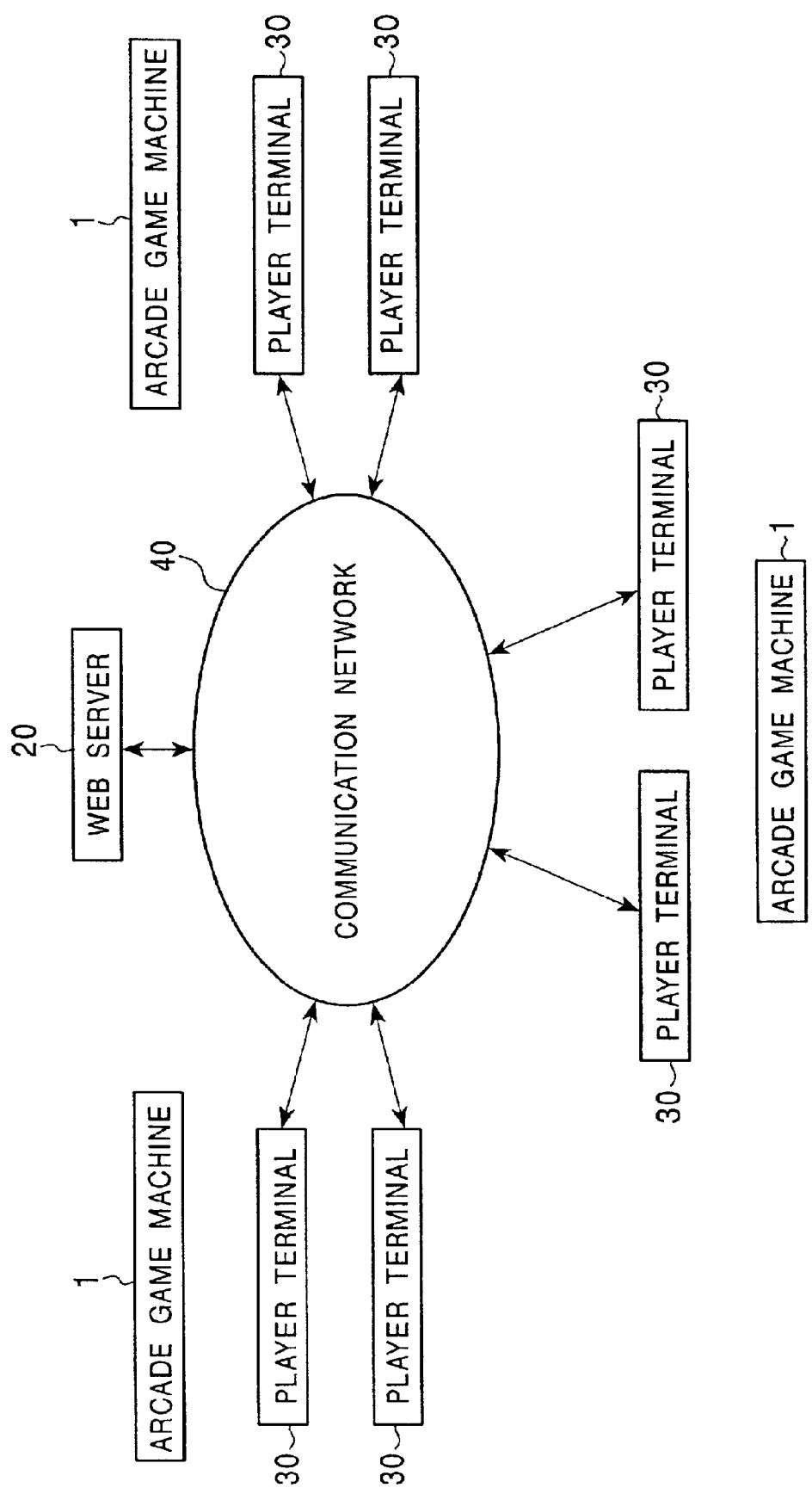
FIG. 2 shows a schematic overview of the overall game system.

Firstly, a structural overview of a game system related to the present embodiment will be described. FIG. 2 shows a schematic structure of an overall game system related to the present invention. The game system is equipped with many arcade game machines 1 installed in arcades and so on all over the world, a Web server 20 administrating and managing the horse racing game site and running the Internet Grand Prix held on the Web site, and player terminals 30 working as client machines, which can be connected to the Internet. A player terminal 30 can be connected to the Web server 20 via a communication network 40 including public telephone lines, dedicated telephone line, cable TV line or wireless communication line forming a network, and can access the horse racing game Web site publically available on the Web server 20 on the Internet using predetermined internet browser. Various data communication between the Web server 20 and the player terminal 30 is performed via the communication network 40 in the form of computer data signals embodied on a fixed carrier wave.

1. Structure of Arcade Game Machine 1

Figure 3:
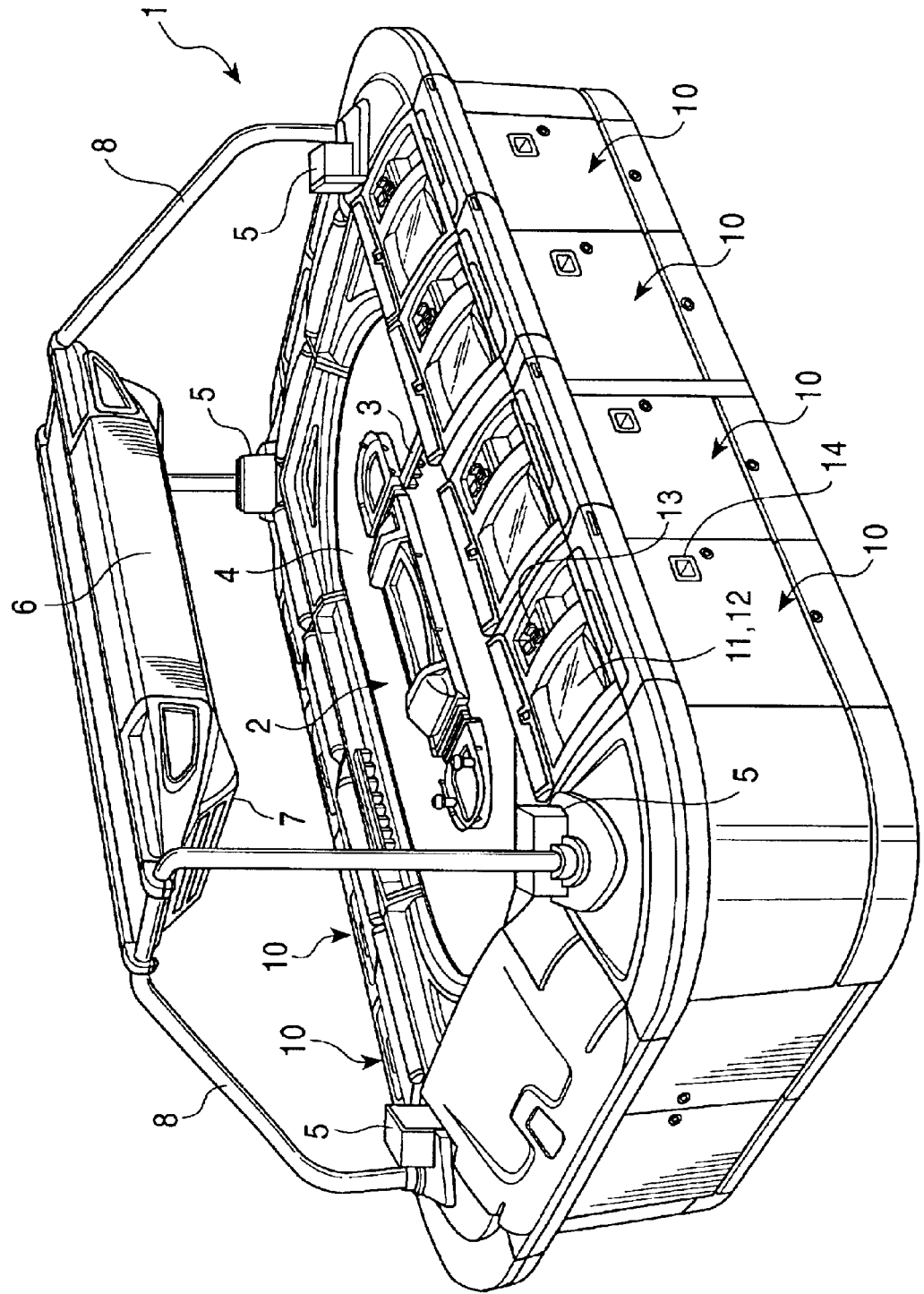
FIG. 3 shows an overview showing an example of arcade game machine making up the game system.

FIG. 3 is an overview showing an example of the arcade game machine 1. The arcade game machine 1 is equipped with a field 2 located in the center section and a plurality of stations 10 surrounding the field 2. The field 2 is equipped with a racetrack 4 and a starting gate 3, and races progresses by moving a plurality of model horses which are not described. A plurality of loudspeakers 5 for broadcasting cheers and announcements and so on are installed around the field 2. Over the field 2 is a display section 6 showing the name of the games and so on, and illumination units 7 are provided for lighting up the field 2. The display section 6 and illumination units 7 are held in position by a support 8.

In the stations 10, displays 11 are installed for displaying game pictures accordingly as the game progresses and touch panels 12 are provided over the displays 11. When players touch a predetermined position of the game screen displayed on the display 11, the position is detected by the touch panel 12 and the player's operations are recognized by the arcade game machine 1. At the stations 10, medal inlet 13 for accepting medals from players and medal-outlet for dispensing medals to players are installed.

In the arcade game machines 1, races with the same names as real horse races are held in turn on a fixed cycle. Sixty races are held in a year and time for betting of medals, that is time for buying betting tickets, time for holding the race, and time for displaying the result of the race are reserved for each race. Players can predict the results and are free to buy betting tickets. Buying betting tickets is performed by using medals, and if the predicted result on the betting tickets which are bought proves right, medals are dispensed according to the number of medals bet and the odds.

In the arcade game machine 1, players can participate in games as owners. Players can purchase their preferred horses by selecting them from a plurality of horses prepared and paying a fixed number of medals. A name for the purchased horse is created by combining a name selected from names prepared in the arcade game machine 1 with the player's name input by the player. Players can rear the purchased horse by training it in order to improve its ability and can enter the reared horse in desired races.

Figure 4:
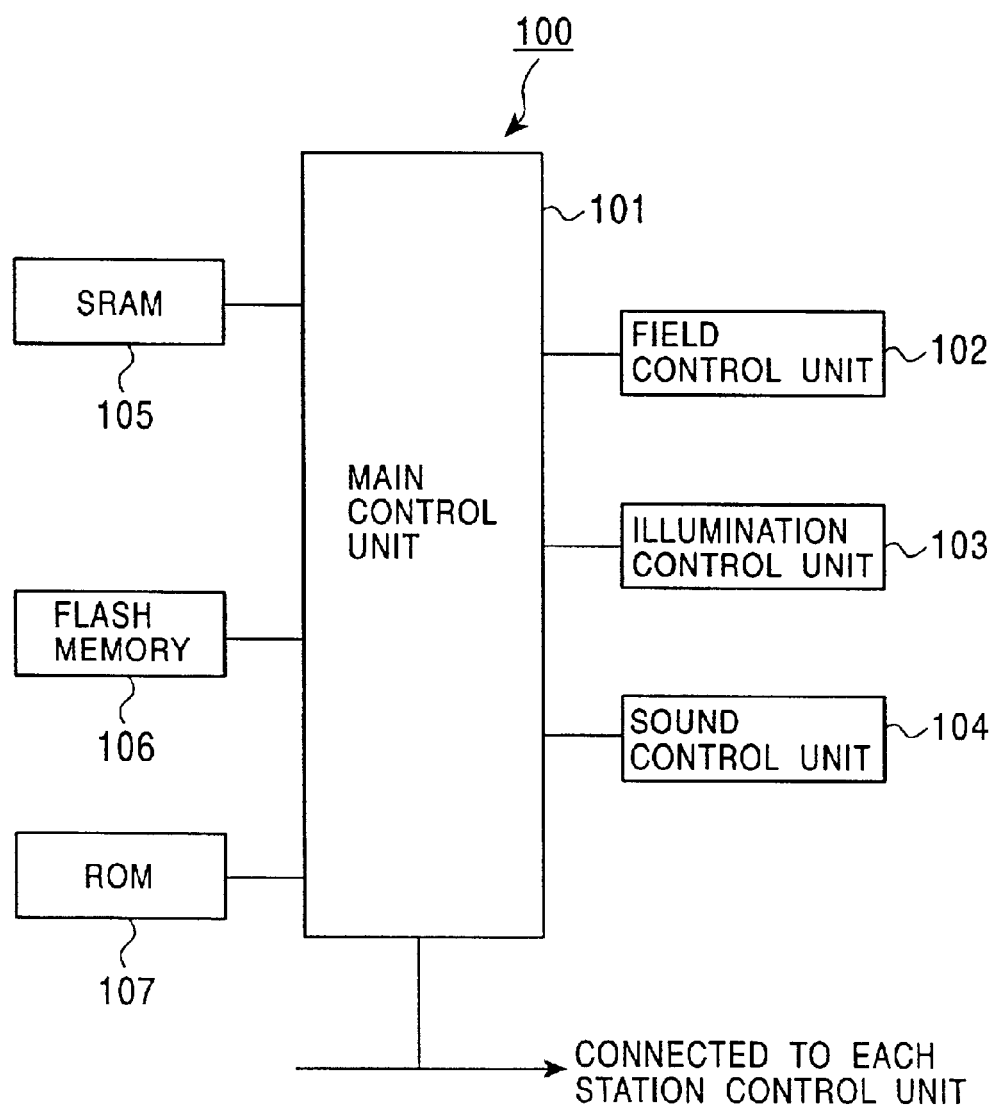
FIG. 4 is a control block diagram showing a main control section in the arcade game machine.
Figure 5:
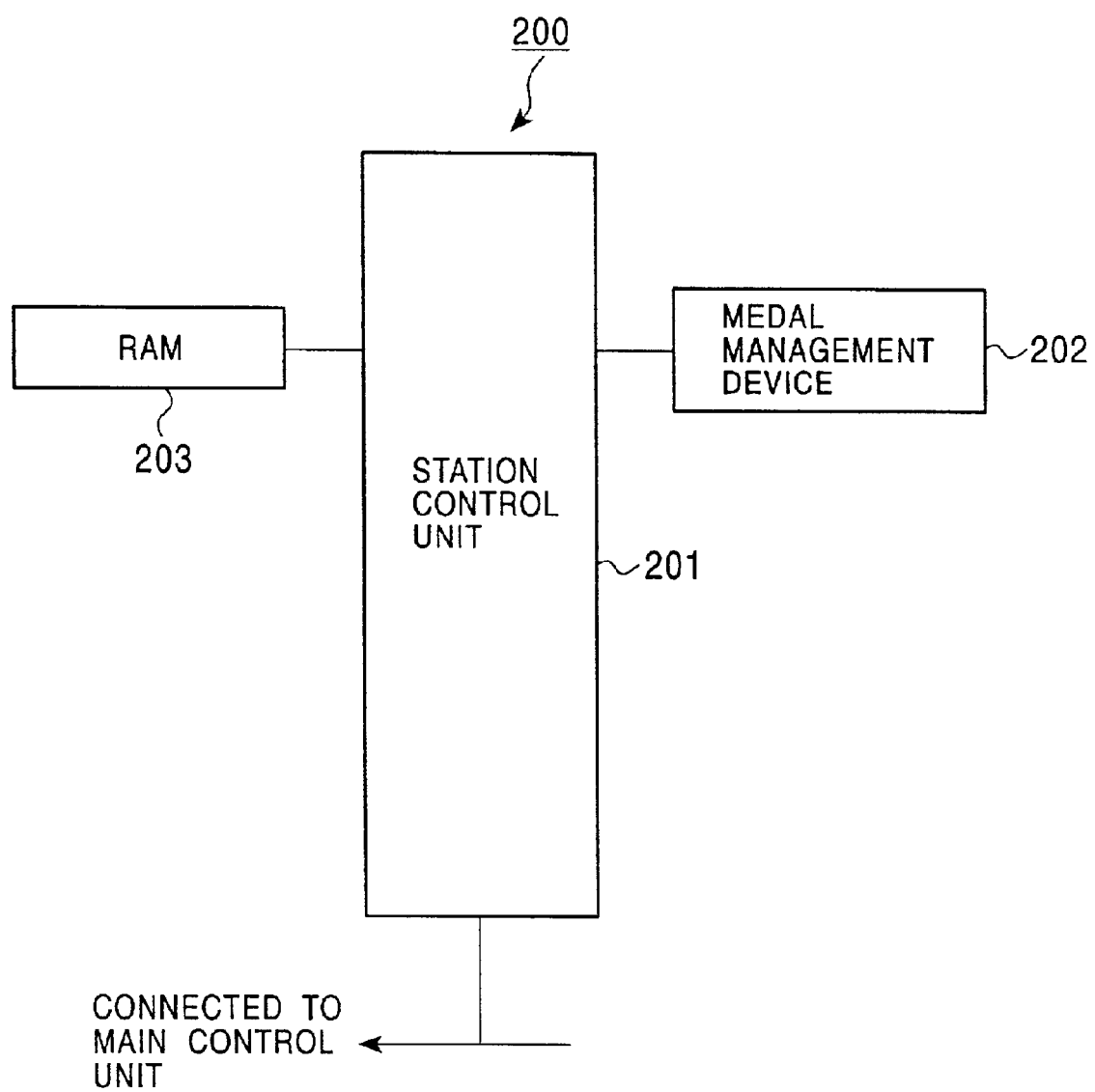
FIG. 5 is a control block diagram showing a station control section in the arcade game machine.

FIG. 4 is a control block diagram showing a main control section 100 for integrated control of the operation of the arcade game machine 1 integratedly, and FIG. 5 is a control block diagram showing a station control section 200 installed in each of the stations 10.

As shown in FIG. 4, the main control section 100 located on the side of the field 2 is equipped with a main control unit 101, a field control unit 102 for controlling running performance of model horses in the field 2, an illumination control unit 103 for controlling the illumination units 7, a sound control unit 104 for controlling cheers and announcements broadcast by the loudspeakers 5, a SRAM (i.e., Static Random Access Memory) 105 and a flash memory 106 for recording various data for each player, and a ROM (i.e., Read Only Memory) 107 for storing various processing programs required for the game and various database. The main control unit 101 is connected to the field control section 102, the illumination control section 103, the sound control section 104, the SRAM 105, the flash memory 106 and the ROM 107. The ROM 107 stores various prepared data of the horse name selected by the players and the horse's sound data, various data related to each horse, and a database such as a race schedule.

The SRAM 105 or flash memory 106 stores a database for players' data recorded and managed for each player. The players' data includes ID codes assigned to each player, personal information related to the players, information on the player's own horses, and update information for recording data update. The players' data also includes information on the status and history of the game and information on the screen layout that is not related to the progress of the game.

The ID code is a unique number assigned to each player, and is arranged not to be duplicated.

The personal information includes information related to individual players such as the players' names, total number of plays, and so on. This personal information can be used as data reflected in the content of the game, such as player's name being used in the so-called crown name of his own horse, and as customer management data. The player's own horse information includes a horse code for specifying the horse's name, breed information for specifying a growth curve showing how the horse is growing, sex, age, number of races, speed, stamina, condition, total prize money won, result of each past race (for example, 1st place, 2nd place, no place) and so on. The horse name code is associated with the data on each horse, and based on the horse name code, the horse data is read and used in the game.

As shown in FIG. 5, the station control section 200 installed at each station 10 is equipped with a station control unit 201, a medal management unit 202 for managing the dispensing of medals, and a RAM (i.e., Random Access Memory) 203 for temporarily storing data on each player. The station unit 201 is connected to the medal management unit 202 and the RAM 203. This station control unit 201 is also connected to the display 11 and the touch panel 12 installed at the station 10 as shown in FIG. 3, and to each bet medal sensor which is not shown in the diagram, for detecting the bet medals via the medal outlet 14.

As shown in FIG. 4 and FIG. 5, the station control unit 201 at each station 10 is connected to the main control unit 101 at the field 2, which enables communication between them.

2. Structure of Web Server 20

Figure 6:
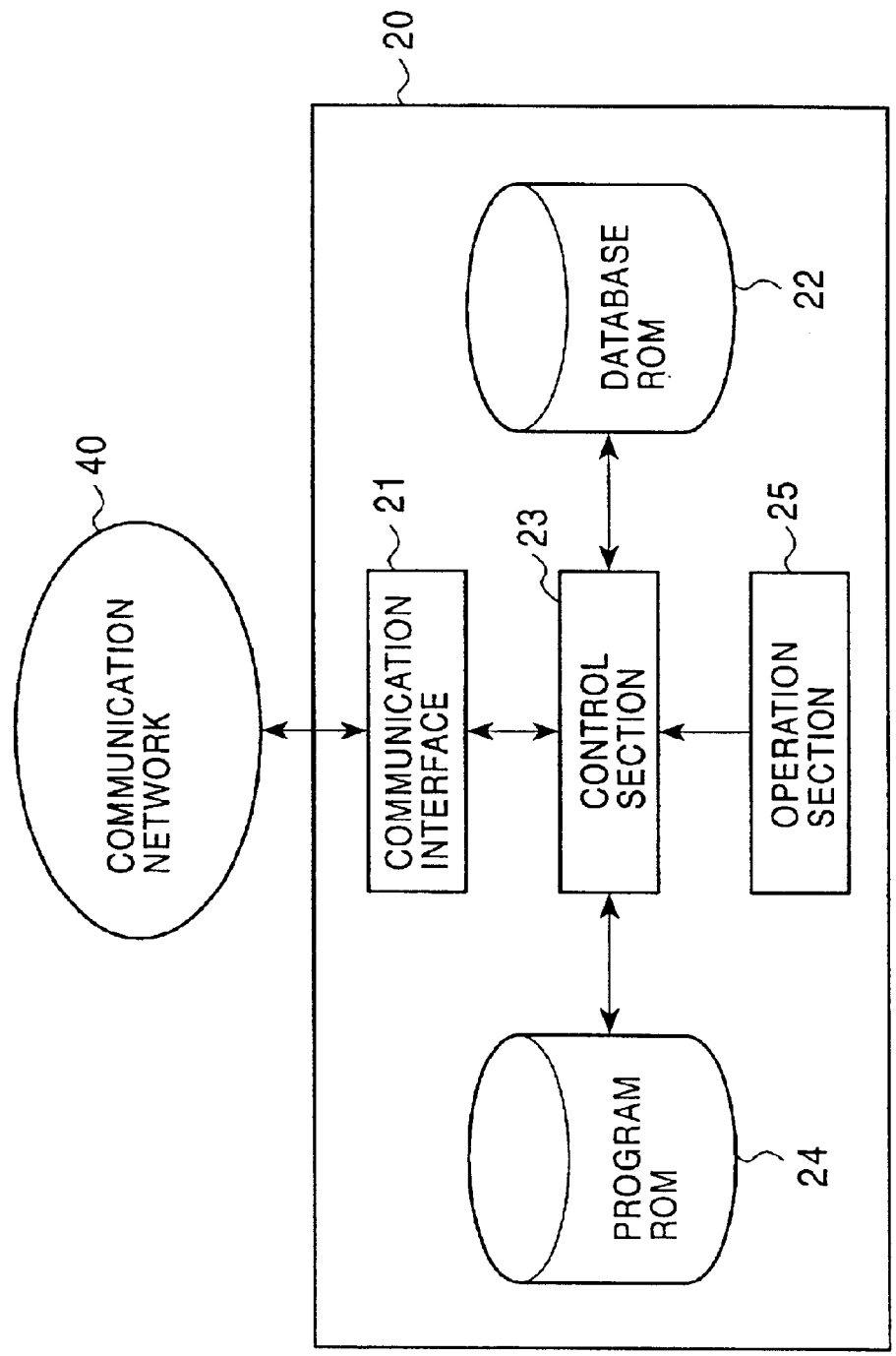
FIG. 6 is a block diagram showing simple structure of Web server making-up the game system.

The structure of the Web server 20 for constructing the game system will be described below. FIG. 6 is a block diagram showing the schematic structure of the Web server 20. The Web server 20 is equipped with a communication interface 21 which works as an application receiving device and an information receiving device, which serves as, for example, a terminal adapter etc. for transmitting and receiving data via the communication network 40, a database ROM 22 which works as a preliminary character recording medium for storing various kind of database, a control section 23 for controlling each part of the Web server 20, a program ROM 24 which works as a recording medium having recorded thereon a processing program to be executed by the control section 23, and an operation section 25 which is operated by operators. A general purpose PC or workstation is may be used as the Web server 20, but part of a Web server managed and administered by a provider could also be used.

The database ROM 22 stores a database of the horse's name and various data related to each horse, which are the same as are stored in the ROM 107 of the arcade game machine 1, in addition to the race schedule of the Internet Grand Prix. The database ROM 22 stores personal information on the participating players in the Internet Grand Prix, and character information related to the player's own horse. This database ROM 22 for could be chosen to be the same as the program ROM 24.

The program ROM 24 stores various processing programs which the control section 23 executes, which are read according to instructions from the control section 23. The program ROM 24 stores a game execution program for executing the Internet Grand Prix held on the Web site, a communication program for transmitting and receiving data via the communication network 40, and a program for executing processes of the Web server 20, in addition to a site management program for administrating and managing the horse racing game site.

The control section 23 comprises at least one processing unit such as a CPU (i.e., Central Processing Unit) etc. and a RAM for temporarily recording program data, and starts up and controls the Web server 20 by reading a predetermined Operating System (OS) stored in the program ROM 24. The control section 23 runs various processing programs stored in the program ROM 24 and executes according to the program. By providing a plurality of processors such as CPUs etc., which execute various processing programs, execution of the various processing programs can be distributed to individual processors.

3. Structure of Player Terminal 30

The structure of the player terminal 30 comprising the game system will be described below.

Figure 7:
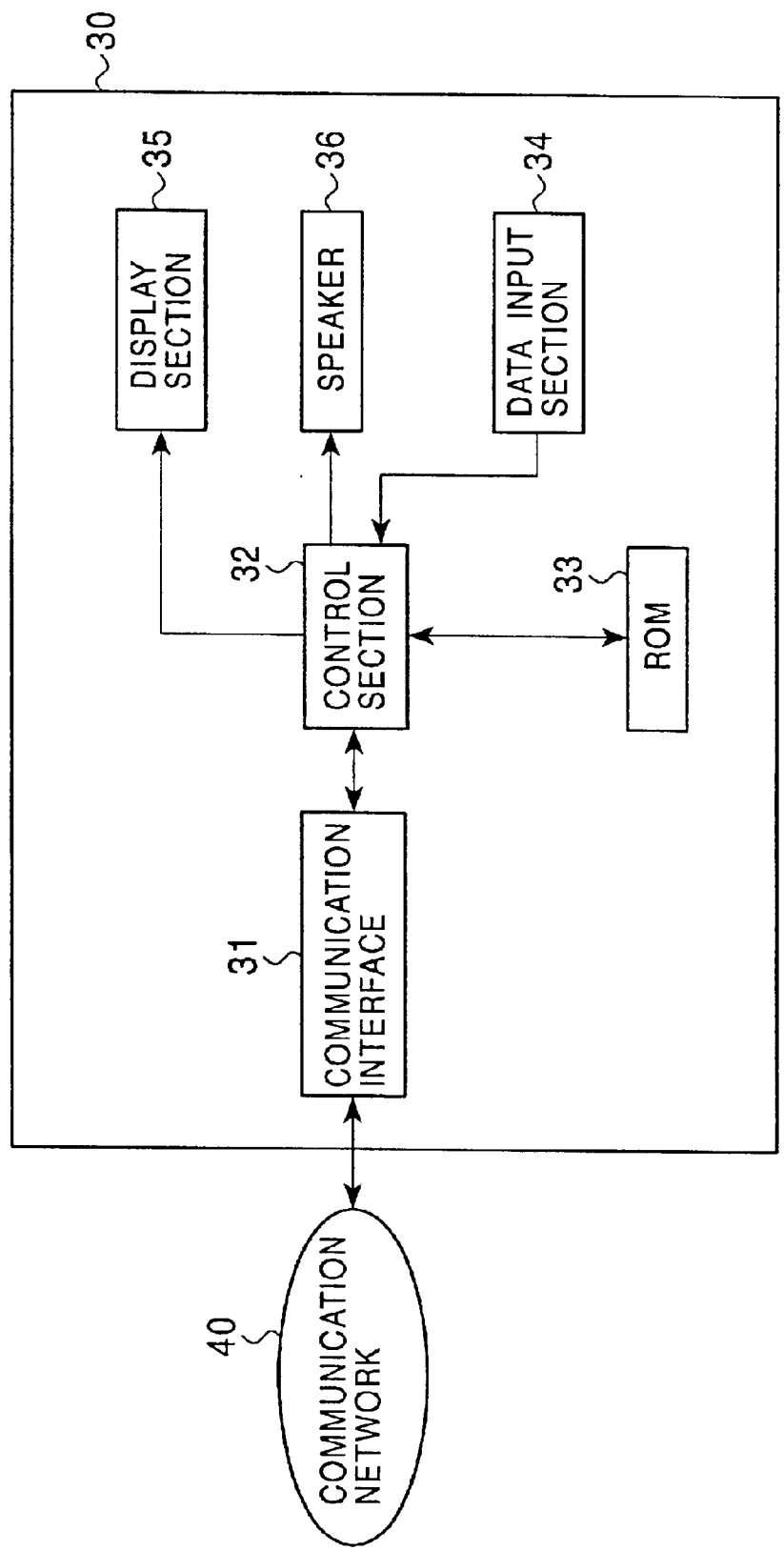
FIG. 7 is a block diagram showing a simple structure of a player terminal making-up the game system.

FIG. 7 is a block diagram showing the schematic structure of the player terminal 30. The player terminal 30 is used for accessing the horse racing game site managed by the Web server 20, providing players with various information published on this site, and allowing them to participate in the Internet Grand Prix. For the player terminal 30, a general purpose PC popular with home-users could be used, but home game machines and appliances such as televisions or mobile communication devices may also be used as long as they can be connected to the Internet, can access the horse racing game site, can be operated as required, and execute the required processes.

The player terminal 30 is equipped with a communication interface 31 comprising terminal adapter for transmitting and receiving data via the communication network 40, a control section 32 for controlling each part, a ROM 33 for recording processing programs which the control section 32 runs, an input section 34 for inputting various requests according to the player's operation, a display section 35 for displaying display data such as image data and so on, and loudspeakers 36 for outputting audible data such as audio data and so on. In the embodiment, the input section 34 comprises a keyboard and a mouse. In addition, headphones and earphones could be available in place of the loudspeakers 36.

The ROM 33 stores a communication program for accessing the horse racing game site managed by the Web server 20, and a browsing program for browsing various information published on the site. The various processing programs stored in the ROM 33 are run by the control section 32. Browsers on the market or distributed browsers are available as browsing programs.

The control section 32 has the same structure as the control section 23 of the Web server 20, and starts up and controls the player terminals 30 by reading out OS stored in the ROM 33. The control section 32 works the various processing programs recorded in the ROM 33 by running it.

4. Series of Processes of Overall System

A series of processes from the players' training of their own horses, reflecting various information in the Internet Grand Prix managed by the Web server 20 as the ability of their own horses, to holding the races using the game system will be described as follows.

Figure 8:
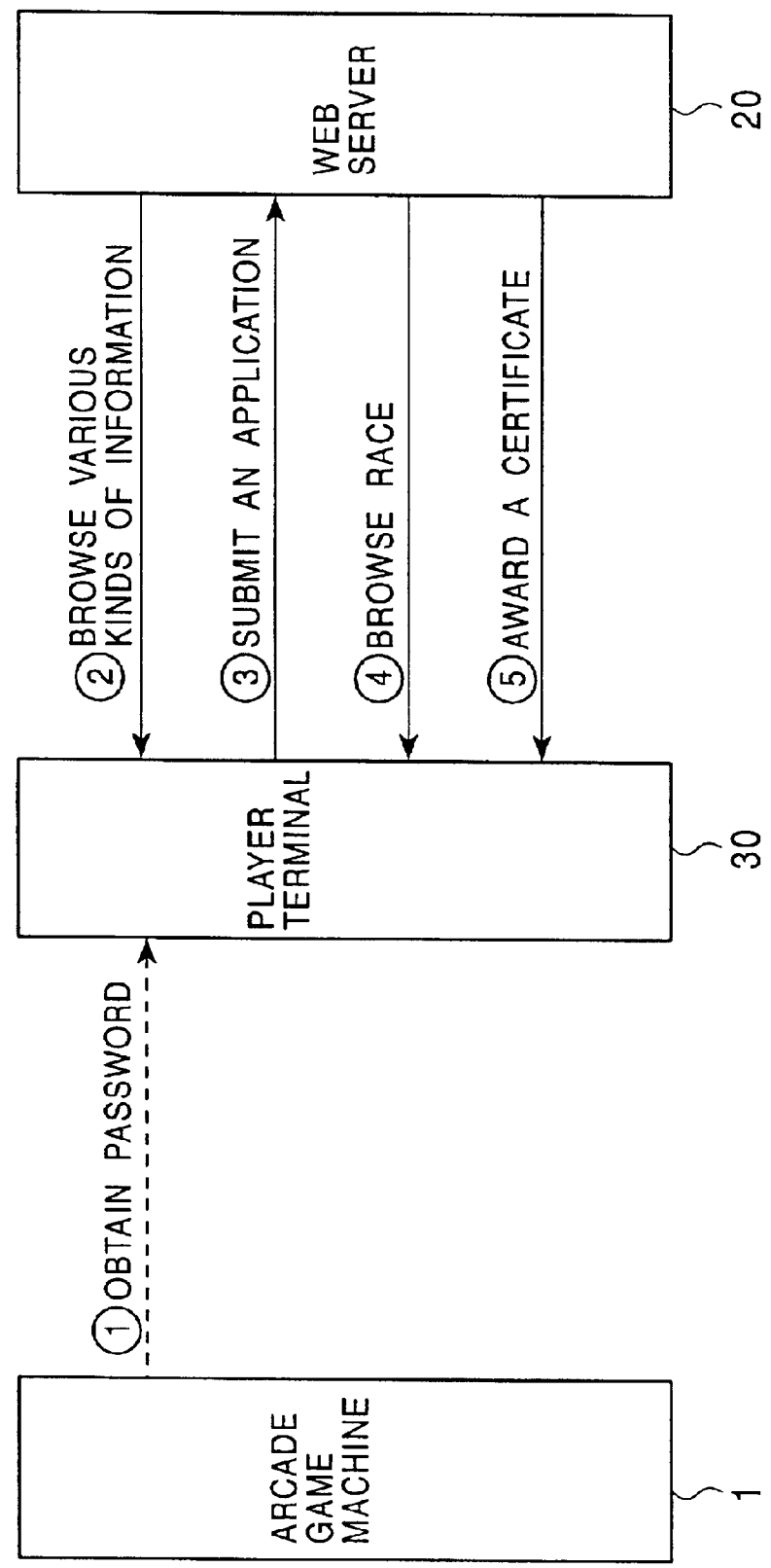
FIG. 8 is an illustrative diagram showing the flow of the game system.

FIG. 8 is an illustrative diagram showing the series of the processes of the game system related to the present embodiment. Firstly, in this game system, players play as horse owners in the arcade game machine 1 and obtain a character-string password converted from a part of the players' data, the character information being obtained in the play of game (step 1). Players can access the horse racing game site and browse various information in the site (step 2). The players can submit applications using the passwords obtained (step 3). The players can browse races in which the players have participated (step 4). Winners of races are awarded a certificate as a prize.

5. Obtaining Password: Step 1

It is possible to obtain the password required for participating in the Internet Grand Prix on condition that players play with the arcade game machine 1, and that their own horses win G1 races prepared in the game more than three times or that the number of medals won (lifetime prize money) is over 2000. When a player's horse which satisfies this conditions retires, the horse becomes a distinguished horse and a password screen as shown in FIG. 9 is displayed on the display 11. On the password screen, the name of the distinguished horse (*** Brian), a password, and an explanation of how to use the password are displayed. The player can obtain the password by making note of this information.

Character information included in the passwords includes a machine code as machine information, day of retirement as date information, daily number as daily ranking, player's name, horse name code, G1 races won as achievement information, total results and life time prize money, and speed ability and stamina ability of the best times as ability information. The player's name and horse name code are the same as those which are used in the arcade game machine 1 as player data.

In the arcade game machine 1, various data such as condition, age and so on are also used as ability information of the player's own horse in addition to speed information and stamina information. However, when the password tries to include all these abilities, it proves to be a very long character string. Then, in this embodiment, ability information to be used in the Internet Grand Prix is restricted to speed information and stamina information, and by shortening the password it is more convenient for the players. In addition, when ability information can be used in the Internet Grand Prix without using such a password, such restrictions as mentioned above are not required. On the contrary, participation assessment (described later) will become more precise by providing more information to the Internet Grand Prix.

6. Browsing Various Information: Step 2

Figure 10:
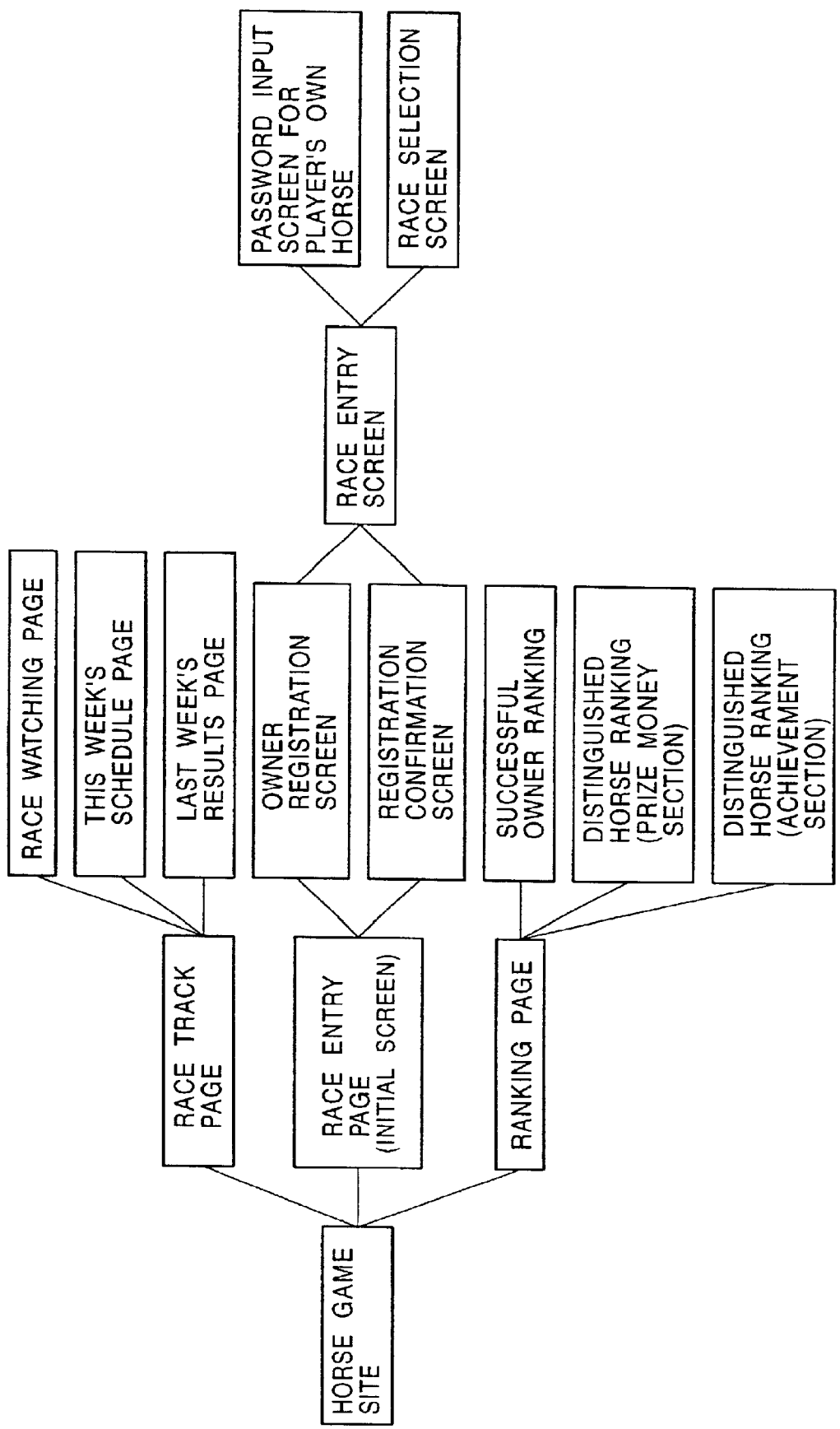
FIG. 10 is an illustrative view showing the structure of a horse racing game site managed by the Web server.

The players can access the horse racing game site managed by the Web server 20 using a personal computer at home as the player terminal 30. FIG. 10 is an illustrative diagram showing the structure of the horse racing game site. The horse racing game site provides a racetrack page for browsing races, race schedules, results of past races, an entry page for registration for participation by application using the password, and a ranking page for displaying various rankings.

In the present embodiment, Internet Grand Prix races are held once a week in the horse racing game site under the management of the Web server 20. For example, five races are held every Friday night. Players who have passwords can participate in these races, which are broadcast on a race watching page, shown in FIG. 11, which can be browsed by players. Information such as terms of submitting applications to each race, race schedule, race results and so on are published on the week's schedule page and last week's results page of the racetrack page. On the ranking page, the ranking of successful owners based on the results in the Internet Grand Prix and distinguished horse ranking which is separated into a prize money section and an achievement section based on results in the arcade game machine 1 are published and browsable to players. The entry page will be described later.

7. Submitting Application: Step 3

Players who obtained the passwords in the step 1 bring them back home and can access the entry page in the horse racing game site managed by the Web server 20 using a personal computer at home as the player terminal 30, for example.

FIGS. 12(a) to (f) are illustrative images showing each screen on the entry page and displayed on the display section when browsing the entry page using the player terminal 30. When the player accesses the entry page using the player terminal 30, an initial screen shown in FIG. 12(a) is displayed on the display section 35. On the initial screen, an explanation of participation in the Internet Grand Prix, an owner registration button for moving to an owner registration screen for owner registration, and an entry button for moving to an entry confirmation screen for confirming the contents of the entry before performing the entry are provided.

A player who participates in the Internet Grand Prix for the first time should click the owner registration button for owner registration on the initial screen by operating the mouse which makes up the input section 34. In this way, the owner registration screen shown in FIG. 12(a) is displayed on the display section 35. On the owner registration screen, the player inputs his e-mail address for communicating with the Web server 20, the owner's name, and access password required for identifying the player when making an entry next time using the keyboard which makes up the input section 34. In addition, the owner's name and access password inputted here are totally independent of the arcade game machine 1. After inputting the fixed items, a 'send' button displayed on the owner registration screen should be clicked. In this way, each inputted item is outputted via the communication interface 31 by the control section 32 running the communication program and is transmitted to the Web server 20 via the communication network 40.

In the Web server 20, the inputted access password received via the communication interface 21 associated with the owner's name by the control section 23 running the owner registration program recorded in the program ROM 24, and the e-mail address are registered in the owner registration database in the database ROM 22. After finishing the registration process, a race entry screen shown in FIG. 12(d) is outputted to the player terminal 30.

Players who have already registered should click the race entry button on the initial screen. In this way, entry confirmation screen is displayed as shown in FIG. 12(c) on the display section 35. The entry confirmation screen is the same as the owner registration screen shown in FIG. 12(b) except that there is no input box for an e-mail address on the entry confirmation screen. Similar to the case of the owner registration screen, after inputting the owner's name and password, these inputted items are transmitted to the Web server 20 by clicking the 'send' button. Upon receiving these inputted items, the Web server 20 reads out the access password from the owner registration database in the database ROM 22 based on the owner's name received by the control section 23 running the entry confirmation program recorded in program ROM 24, verifies the access password received and if verified, it outputs the race entry screen shown in FIG. 12(d) to the player terminal 30. On the other hand, if not verified, a message such as "password is incorrect" is outputted to the player terminal 30.

On the display section 35 on the player terminal 30 of a player who completed the owner registration or entry confirmation, the race entry screen is displayed as shown in FIG. 12(d). When this is the first race for the horse the play tries to register, a distinguished horse registration button displayed on the race entry screen should be clicked initially. In this way, a horse's password input screen is displayed as shown in FIG. 12(e). On the horse's password input screen, the password obtained in the arcade game machine 1 should be inputted and the 'send' button should be clicked. In this way, the password is outputted via the communication interface 31 as an application by the control section 32 running the communication program, and is transmitted to the Web server 20 via the communication network 40.

In the Web server 20, various information such as ability information and achievement information included in the password is obtained by decoding the password received via the communication interface 21 by the control section 23 running the password decode program recorded in program RON 24. The various information is to be registered in the owner registration database in the database ROM 22 by the control section 23 running the information registration program.

The control section 23 running the information registration program here works as a participation assessing device and a participation allowing device. In other words, it assesses whether or not a distinguished horse related to the password received is already registered as a distinguished horse in the owner registration database. When it determines that the same distinguished horse is already registered, notification saying that it is already registered is transmitted to the source player terminal 30 and the horse's password input screen shown in FIG. 12(e) is displayed again on the display section 35 on the player terminal 30. As a result, participation in the Internet Grand Prix by the distinguished horse related to the password is disallowed. On the other hand, when it determines that the same distinguished horse is not registered, the control section 23 works as a participation process executing device and runs the distinguished horse registration process, which is a participation process for registration of various information included in the password to the owner registration database of the database ROM 22 as the information registration program runs. After finishing the distinguished horse registration execution above, the race entry screen as shown in FIG. 12(d) is outputted to the player terminal 30.

After completing the distinguished horse registration, the name of the player's own horse registered as the distinguished horse, the lifetime prize money, the total results and G1 races won in the arcade game machine 1 are displayed as shown in FIG. 12(d) on the race entry screen. If the horse has participated in the Internet Grand Prix, the results in the Internet Grand Prix are also displayed. When the player makes an entry to the Internet Grand Prix, the 'participation' button on the race entry screen should be clicked. In this way, the application is outputted by the control section 32 running the communication program via the communication interface 31 and is transmitted to the Web serve 20 via the communication network 40.

In the Web server 20, the control section 23 running the participation allowing/disallowing program working as a participation assessing device and a participation allowing device assesses whether or not to allow the player's own horse related to the application to participate in the race based on the application received via the communication interface 21.

Figure 1:
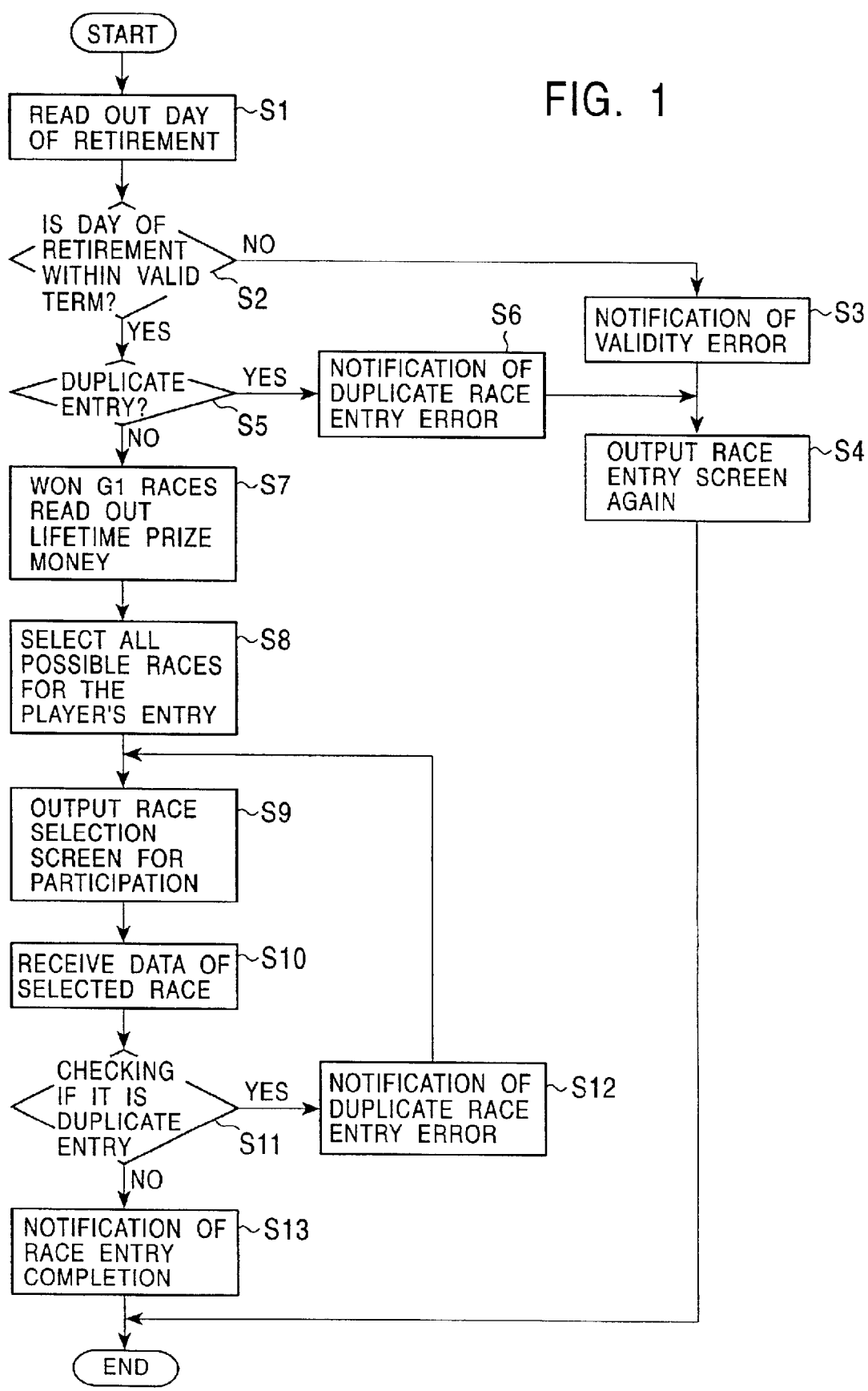
FIG. 1 is a flow chart showing control operations of control section running participation allowing/disallowing program in Web server of game system related to an embodiment of the present invention.

FIG. 1 is a flowchart showing a controlling function of the control section 23 running the participation allowing/disallowing program.

When the control section 23 receives the application, it initially reads the day of retirement of the player's own horse related to the application from the owner registration database in the database ROM 22 (S1). It assesses whether or not the day of the race in which the player's own horse participates is valid based on the day of retirement (S2). In the present embodiment, as the term of validity of the password is set to be 90 days, it assesses whether or not the day of retirement is within 90 days from the race day. By this assessment, when it is assessed to be more than 90 days away from race day, an expiration error notification is transmitted to the source player terminal 30 (S3), and the race entry screen as shown in FIG. 12(d) is outputted again. (S4). As a result, the player's own horse related to the password is not allowed to participate in the Internet Grand Prix.

When the day of retirement is assessed to be within 90 days from the race day, it is assessed whether or not the player's own horse related to the application is already registered by looking it up in the race entry database of database ROM 22 storing information on each player's own horse and each owner which will participate in the Internet Grand Prix (S5) this time. When it is assessed to be a duplicate entry, a duplicate entry error notification is transmitted to the source player's terminal 30 (S6), and the race entry screen as shown in FIG. 12(d) is outputted again. In this way, duplicate entry to one or more races by one player's own horse could be prevented.

After checking for duplicate entries in this way, the control section 23 works as an achievement reading device so that it reads information on G1 races won and the lifetime prize money related to the application from the owner registration database of the database ROM 22 (S6). Races in which the horse can participate are then selected based on G1 races won and the life time prize money (S7). By this selection, the player's own horse related to the password is not allowed to participate in specific races. Predetermined participation conditions are set for each race on race data tables stored in the database ROM 22. During the race selection, races which satisfy the participation conditions are selected by comparing information of G1 races won and the lifetime prize money, which are read with conditions for each race on the race data tables. It could be shown as examples of the participation conditions that the number of G1 races won exceeds the fixed number, the lifetime prize money exceeds the fixed amount of money, or predetermined G1 races are won.

In this case, the player's own horse is assessed here to be allowed/disallowed to participate in races by selecting races based on participation conditions such as G1 races won and the lifetime prize money as result information in the arcade game machine 1. However, it may be possible that the player's own horse is assessed to be allowed/disallowed to participate in races by selecting races based on replaced or additional participation conditions such as G1 races won, the lifetime prize money, and soon in the Internet Grand Prix.

In the present embodiment, each race is held with eighteen horses, thus eighteen players at most can register for each race. For this reason, when eighteen horses are already registered by other players, the race is excluded from selected even if the player's own horse related to the application satisfies the conditions for the race. In this way, the player's own horse related to the password is not allowed to participate in races in which eighteen horses are already registered.

In the present embodiment, applications are allowed to be registered in turn, so applications for participation are arranged to be rejected for races without vacancies. However, it is also possible that more applications than the limit are accepted and it is assessed and determined which horses can participate according to predetermined participation conditions after stopping accepting applications. For example, it may be possible that the best 18 horses can be selected and allowed to participate in a race by reading the speed ability and stamina ability included in the password from the owner registration database after stopping accepting applications by the control section 23 acting as an ability information reading device.

It may also be possible to allow horses of players with a lot of experiences of being rejected participation to participate prior to others based on rejected participation history information by having registered the rejected participation information of players with experience of being rejected in the owner registration database.

In addition, it is also preferable that races in which only male or female horses can participate are prepared just as real races among races of the Internet Grand Prix. In this case, races in which the horse can participate are selected based on sex information and ability information of the player's own horse, which is included in the password outputted by the arcade game machine 1.

In this way, when a race is selected, a race selection screen displaying selected races is outputted on the player terminal 30 (S8). In this way, the race selection screen shown in FIG. 12(f) is displayed on the display section 35 of the player terminal 30. After selecting races in which player wants to have their own horse participate by viewing the race selection screen, the player selects the box where the race is displayed by clicking it and then clicks the 'send' button. In this way, data of the selected race is outputted via the communication interface 31 by the control section 32 running the communication program and transmitted to the Web server 20 via the communication network 40.

When data of the selected race is received (S9), it is assessed whether the owner who applied for participation is someone whose horse has already been registered for the race related to the application by referring to race entry database in the database ROM 22 (S10). When the owner is assessed to have already registered his own horse for the race, a duplicate entry error by one owner notification is transmitted to the source player terminal 30 (S11), and the race selection screen shown in FIG. 12(f) is outputted again (S8). By this process, the horse related to the password is not allowed to participate in the race. As a result, more owners can register for the race. On the other hand, when the owner is assessed not to have registered, an entry completion notification is transmitted to the source player terminal 30 (S12).

In the present embodiment, the number of player's own horses which can be registered for a race in the Internet Grand Prix is limited to five, and the other thirteen horses are arranged to be filled with computer horses, the preliminary computer horse characters which are read at random from a computer horse database stored in the database ROM 22 which is a preliminary character recording medium. It is also possible to hold a race with eighteen player's own horses. In the computer horse database, many computer horses with various speed ability or stamina ability are registered.

When only three player's own horses are registered for one race in the Internet Grand Prix by players, the remaining two horses are filled by the control section 23 running a horse filling program acting as a character participation device. In filling the horses, the control section 23 performs registration processing for allowing two horses selected at random from the computer horses registered in the computer horse database. In filling the horses, it is also possible for the ability data of the computer horse to be changed in order to be comparable to the ability of the players' own horses registered by the players, so that the computer horse registered in the computer horse database is not used in its original form. It may also be possible to fill computer horses created to have ability depending on the ability of player's own horses registered by players.

In the present embodiment, the configuration in which all applications to the Web server 20 are submitted using the player terminal 30 is described, but other configurations for application are also possible. For example, a configuration in which applying for participation in races is done by writing the obtained password, desired race, and other required items in an application sheet, and sending it to the Web server 20 is also possible. In this configuration, items inputted in the application sheet are inputted by the operator and so on using the operation section 25.

8. Browsing Races: Step 4

After waiting for a predetermined period of time for acceptance of applications, the control section 23 running the game execution program recorded in the program ROM 24 in the Web server 20 starts and advances the Internet Grand Prix at a predetermined time according to the race schedule stored in the database ROM 22. Each race held in the Internet Grand Prix is publically available in real time on the race watching page provided on the racetrack page, as shown in FIG. 11. Not only players who have applied for participation in the Internet Grand Prix in step 3, but also all people who access this page can watch the state of races publically available on the race watching page.

Figure 13:
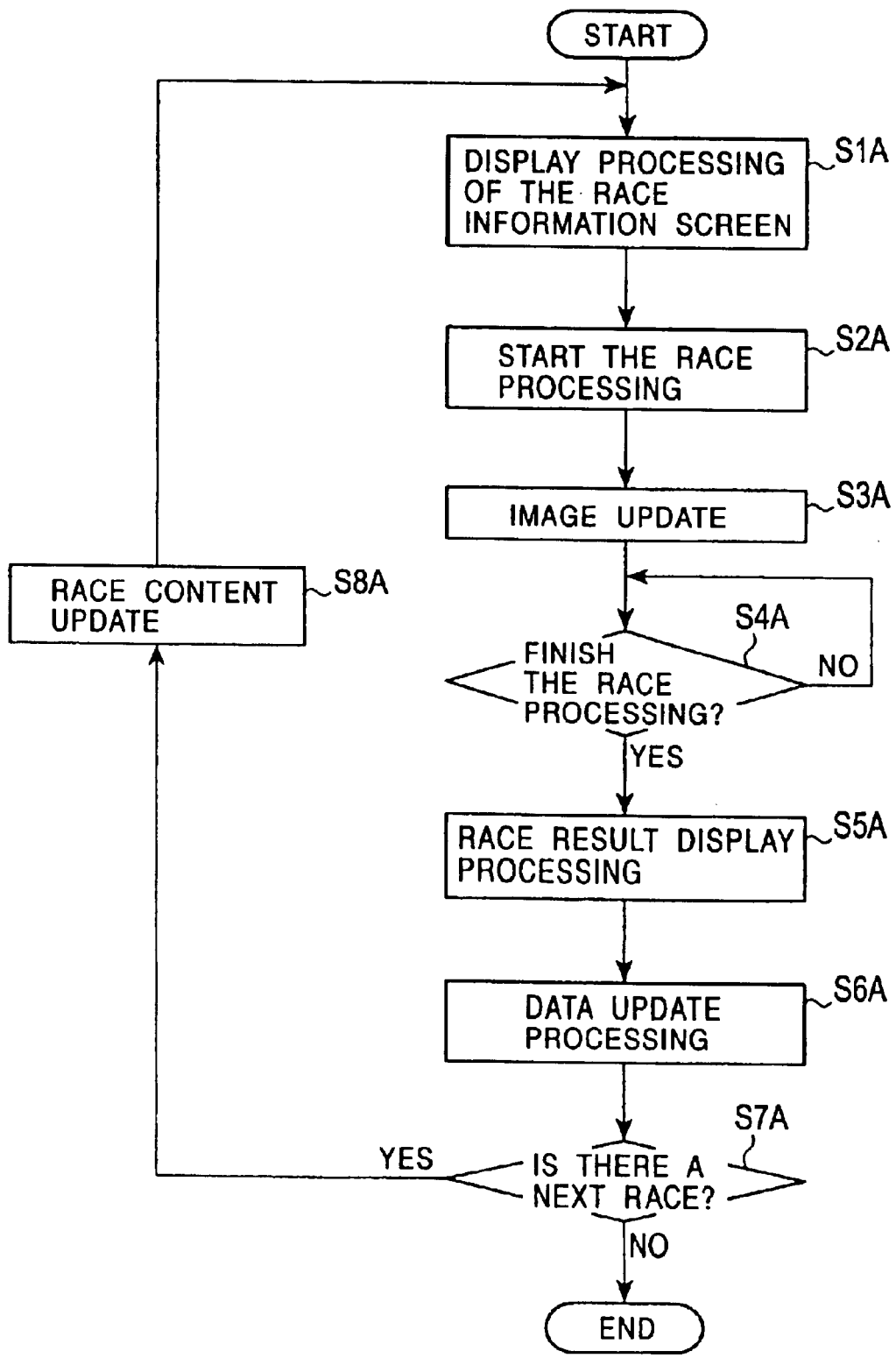
FIG. 13 is a flow chart showing control operation of control section 23 running game execution program in the Web server.

FIG. 13 is a flow chart showing the control sequence of the race progress of the Internet Grand Prix by the control section 23 running the game execution program. The control section 23 in turn executes race processing for allowing horses related to applications to participate in races and holding races for each race, race result displaying processing for displaying race rankings, and data updating processing for updating the contents of the owner registration database in the database ROM 22. One Internet Grand Prix has five races, which are executed with an interval of about two minutes each, including the race result displaying processing.

Firstly, the control section 23 executes displaying processing which displays race information as shown in FIG. 14 (S1A), and provides players with information of the next race. When the scheduled time in the race schedule comes, the control section 23 performs race processing for realizing images displayed in the race and sound, and starts up the race (S2A). During the race, a race screen as shown in FIG. 15 is updated every 5 minutes by the race processing (S3A), and produces ambient sound such as applause. These images are downloaded to the player terminal 30 via the communication network 40 and are then displayed on the display section 35.

After finishing the race (S4A), the control section 23 executes race result displaying processing for displaying the race results on the race watching page (S5A), and then a race result displaying screen as shown in FIG. 16 is displayed. On the display section 35 of the player terminal 30. In the race result displaying screen, race rankings and so on are displayed. The control section 23 runs data updating processing for updating data such as the ranking of each horse along with various kinds of information for each horse, and then historical information such as the race achievement of each horse is registered in the owner registration database.

After finishing this processing, the control section 23 assesses if a subsequent race exists (S7A). If it exists, the race contents are changed to that of the next race (S8A), and returns to S1A, and performs race processing, race result displaying processing, and data updating processing for the next race in the same way as shown above. After finishing all races and the control section 23 assesses that a subsequent race does not exist (S7A), the Internet Grand Prix finishes.

In the Internet Grand Prix in the present embodiment, a password outputted by the arcade game machine 1 is required for participation, and once it is obtained, the ability of the horse related to the password will never change. On the other hand, it is also possible to add a training program to the game execution program so that a function for training the players' own horses can be added. For example, ability information of the players' own horses trained in the arcade game machine 1 is made available as initial ability information of a new horse in the Internet Grand Prix run on the Web server 20. An example of this configuration will be described below.

Figure 17:
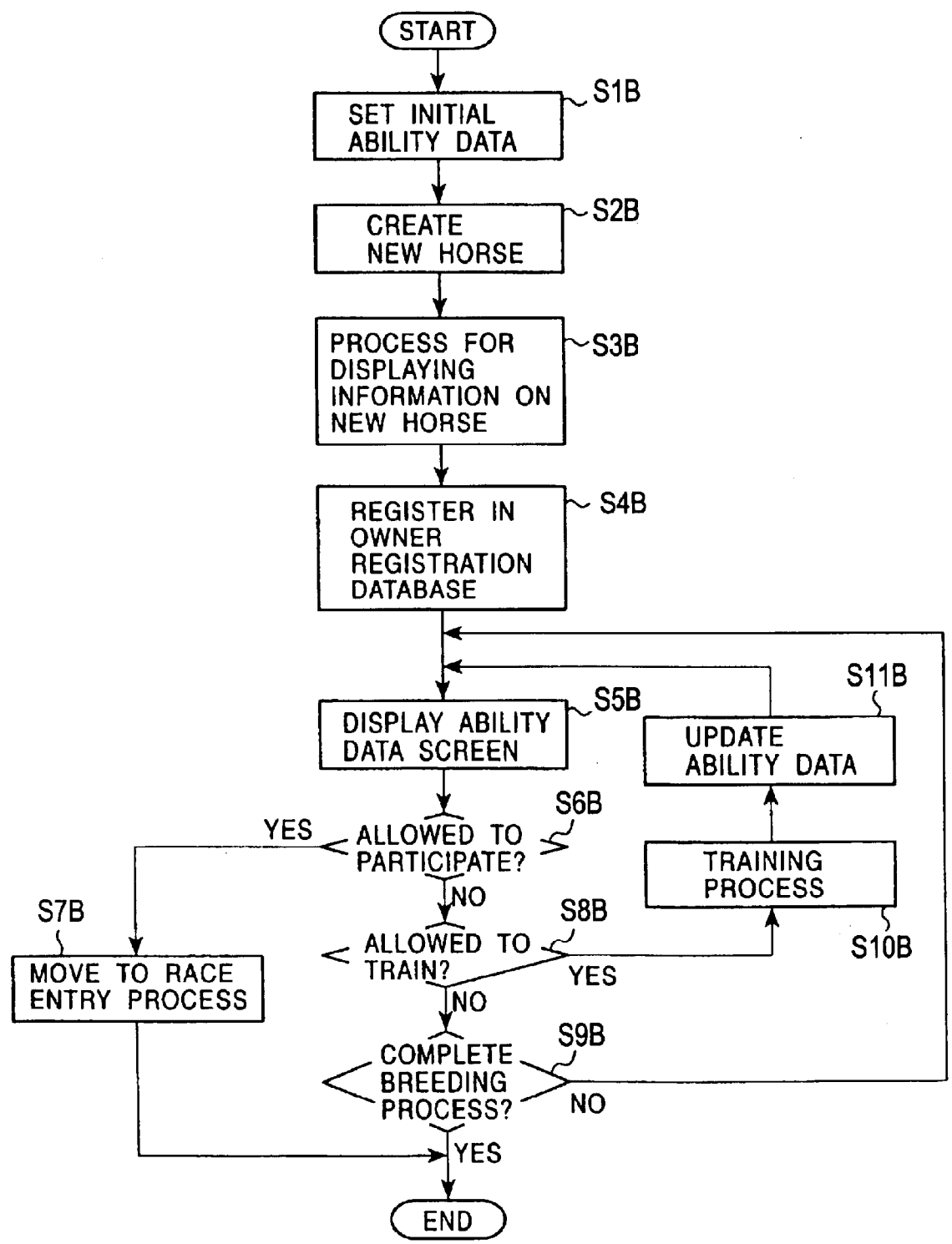
FIG. 17 is a flow chart of training processing by the control section running an initial setting program and a training program, acting as an ability changing device.

FIG. 17 is a flow chart showing an example of training processing by the control section 23 running a processing program for initial setting and a training program acting as an ability changing device. The control section 23 at first sets initial ability information based on speed ability and stamina ability included in a password inputted in the password input screen shown in FIG. 12(*e*) (S1B) . This initial ability information becomes higher as ability information of the player's own horse trained in the arcade game machine 1 becomes higher, and it is different for each horse. A new horse with the initial ability is created (S2B). After that, a part of the ability information is displayed and display processing (S3B) is performed for displaying information of the new horse on the display section 35 of the player terminal 30, and also causes the player to decide whether or not the player will register for participation in the Internet Grand Prix using the new horse. If registration is selected, registration processing starts, as described above.

After finishing registration of the new horse, display processing for displaying the ability information screen displaying ability data of the new horse on the display section 35 on the player's terminal 30 is performed (S5B), and also allowing player to select whether or not registration for participation in the Internet Grand Prix is performed (S6B). When the registration for participation is selected, the race entry processing will begin (S7B).

On the other hand, if registration is not selected, the player is prompted to choose whether he will trained the new horse (S8B). If the player determines not to train, the player is asked whether the training processing is finished or not (S9B), and if decides that it is not finished, he will be back to (S5B) and see the ability information screen displayed again. On the other hand, if the player decides to train the new horse, training processing will be performed for training the new horse to improve its ability (S10B). After training, the ability information of the new horse registered in the owner registration database is updated (S11B) to the ability information changed by the training process. After that, the process returns to S5B and the ability information screen is displayed.

In this configuration, the ability information such as speed ability and stamina ability of each player's new horse is changed by the training process so that each new horse will have a different ability. Thus, it may also be possible for the control section 23 running the participation allowing/disallowing program, working as a participation assessing device and a participation allowing device, to assess applications for the Internet Grand Prix based on participation conditions such as the ability information of the new horse.

In the present embodiment, various kinds of processing program by the control section 23 of the Web server 20 are obtained in the form of a medium such as CD-ROM etc., on which the processing program is recorded. This is also true for various kinds of processing program run by the main control section 100 or station control section 200 in the arcade game machine 1. Processing programs of this kind can be obtained by receiving signals transmitted by a computer working as a transmitter via a transmission medium such as the communication network 40 etc. These signals are computer data signals embodied in a fixed carrier wave including processing programs. During transmission, at least apart of the processing program should be transmitted via the transmission medium. In other words, it is not necessary for all the data included in the processing program to exist on the transmission medium simultaneously. A transmission device for transmitting processing programs from the computer includes a processing device for continuously and continually transmitting data included in the processing program.

In this embodiment, we have considered a horse racing simulation game as an example of a network game, however, the present invention is not restricted to this example as long as it is a network game in which many players can participate. It is not necessary for the game running on the arcade game machine 1 and the network game running on the Web server 20 to always be of the same kind. In other words, it is also possible that the ability information of a trained character in the arcade game machine 1 running a role playing game be passed to the Web server 20 running a horse racing simulation game as a network game, and the ability information of each race horse in the horse racing simulation game is transformed.

In the present embodiment, the control section 23 is arranged to assess applications for participation in the Internet Grand Prix. However, processes could be distributed by locating a part of the participation allowing/disallowing program on the player terminal 30 as a client machine, and a part of or all of each process run in the arcade game machine 1, the Web server 20 and the player terminal 30 could be run on other machines making up the game system.

As described above, according to the present invention, there is the advantage of maintaining the enjoyment of the network game by suitably setting participation conditions so that the number of participating players can be limited and adjusted to a number suitable for the network game, when the number of applications received exceeds a predetermined number of participants.

Particularly, according to the present invention, there is the advantage of assessing fairly whether or not to allow participation in turn, irrespective of the achievements of the players who want to participate or the ability of characters used by players.

According to the present invention, there is the advantage of providing enthusiastic players with advantageous participation conditions or of equalizing the level of players who play together, because it assesses whether or not to allow participation based on the past achievements.

According to the present invention, there is the advantage of realizing exciting games by equalizing the ability of participating characters in a network game in which competition or matches with other players are performed, because equalization of the ability of the characters who participate in the network game is possible.

According to the present invention, there is the advantage of providing chances for participation with as many players as possible, because it allows players with experience of being disallowed from participating to participate prior to others.

According to the present invention, there is the advantage of prompting players to use other game units, because it assesses whether or not to allow participation based on information obtained in other game units such as arcade game machines, home use machines, and so on.

According to the present invention, there is the advantage of maintaining the enjoyment by filling the race with preliminary characters so that the number of participants can be adjusted to a number suitable for the network game when the number of participants is not sufficient.

It is contemplated that numerous modifications may be made to the network game machine, the game system having the network game machine, and the recording medium, such as a computer readable medium, having recorded thereon a processing program for operating the network game machine and computers which the network game machine comprises, of the present invention without departing from the spirit and scope of the invention as defined in the following claims.

What is claimed is:

1. A network game unit connected to a plurality of client machines via a network and running a network game in which a plurality of players using the plurality of client machines can participate, the network game unit comprising:
    an application receiving device which receives application for participation in the network game;
    a participation assessing device which assesses whether or not to allow applications received by the application receiving device to participate in the network game according to predetermined conditions of participation; and
    a participation process executing device which executes whether to enable players or characters used by the players related to the applications assessed to be allowed to participate by the participation assessing device to participate in the network game,
    wherein the network game allows each of the players to bet a gaming value with respect to one or more characters in the network game, and allows each of the players to receive a dividend according to a result of the network game.

2. The network game unit of claim 1, wherein the participation assessing device allows players or characters used by the players related to the applications to participate in turn, and disallows players or characters used by the players related to applications received after a number of received applications reaches a predetermined number of participants to participate.

3. The network game unit of claim 1, wherein the participation assessing device assesses whether or not to allow players or characters used by the players, on condition of past achievements of players or characters used by the players, to participate.

4. A network game unit of claim 1, further comprising an ability changing device which changes ability of characters used by the players in the network game, wherein the participation assessing device assesses whether or not to allow participation in the network game on condition of ability of the characters.

5. A network game unit connected to a plurality of client machines via a network and running a network game in which a plurality of players using the plurality of client machines can participate, the network game unit comprising:
    an application receiving device which receives application for participation in the network game;
    a participation assessing device which assesses whether or not to allow applications received by the application receiving device to participate in the network game according to predetermined conditions of participation; and
    a participation process executing device which executes whether to enable players or characters used by the players related to the applications assessed to be allowed to participate by the participation assessing device to participate in the network game,
    wherein the participation assessing device assesses whether to allow players or characters used by the players having been disallowed to participate in the network game in the past by the participation assessing device to participate prior to others.

6. A network game unit of claim 1, further comprising:
    an information receiving device which receives character information which is information related to characters used by the players in other game units; and
    an achievement information reading device which reads the past achievements of the characters from the character information received by the character information receiving device,
        wherein the participation assessing device assesses whether or not to allow participation in the network game based on the achievement information read by the achievement information reading device.

7. A network game unit of claim 1, further comprising:
    an information receiving device which receives character information which is information related to characters trained by the players in other network game units; and
    an ability information reading device which reads out ability information of the characters from the character information received by the character information receiving device,
        wherein the participation assessing device assesses whether or not to allow participation in the network game on condition of ability information read by the ability information device.

8. A network game unit connected to a plurality of client machines via a network and running a network game in which a plurality of players using the plurality of client machines can participate, the network game unit comprising:
    an application receiving device which receives applications for participation in the network game;
    a participation allowing device which allows players or characters used by the players related to the applications based on applications received by the application receiving device;
    a preliminary character recording medium which records preliminary characters which are not used by players; and
    a preliminary character participation enabling device which enables preliminary characters recorded in the preliminary character recording medium to participate in the network game when the number of applications allowed to participate does not reach a predetermined number of participants.

9. A game system, comprising:

a game machine running a game using characters used by players; and a network game machine connected to client machines via a network and running a network game which players using the client machines can play using ability information which is information related to ability of characters used in the game machines, wherein the network game machine comprises:

an application receiving device which receives application for participation in the network game;

a participation assessing device which assesses whether or not to allow applications received by the application receiving device to participate in the network game according to predetermined conditions of participation; and a participation process executing device which executes whether to enable players or characters used by the players related to the applications assessed to be allowed to participate by the participation assessing device to participate in the network game, wherein the network game allows each of the players to bet a gaming value with respect to one or more characters in the network game, and allows each of the players to receive a dividend according to a result of the network game.

10. A game system, comprising:

a game machine running a game using characters used by players; and a network game machine connected to client machines via a network and running a network game which players using the client machines can play using ability information which is information related to ability of characters used in the game machines, wherein the network game machine comprises:

an application receiving device which receives applications for participation in the network game;

a participation allowing device which allows players or characters used by the players related to the applications based on applications received by the application receiving device;

a preliminary character recording medium which records preliminary characters which are not used by players; and a preliminary character participation enabling device which enables preliminary characters recorded in the preliminary character recording medium to participate in the network game when the number of applications allowed to participate does not reach a predetermined number of participants.

11. A computer readable medium having recorded thereon a processing program for operating the network game unit, which is connected to a plurality of client machines via a network and running a network game in which a plurality of players using the plurality of client machines can participate, and which comprises an application receiving device which receives application for participation in the network game, a participation assessing device which assesses whether or not to allow applications received by the application receiving device to participate in the network game according to predetermined conditions of participation, and a participation process executing device which executes whether to enable players or characters used by the players related to the applications assessed to be allowed to participate by the participation assessing device to participate in the network game, wherein the network game allows each of the players to bet a gaming value with respect to one or more characters in the network game, and allows each of the players to receive a dividend according to a result of the network game, the computer readable medium comprising:

a first processing routine for assessing whether or not to allow participation in a network game with respect to an application for the participation in the network game in accordance with predetermined conditions of participation; and a second processing routine for executing a participation process, which enables a player, related to the application allowed in the first processing routine, to participate in the network game, or which enables a character used by the player to participate in the network game.

12. A computer readable medium having recorded thereon a processing program for operating the network game unit, which is connected to a plurality of client machines via a network and running a network game in which a plurality of players using the plurality of client machines can participate; and which comprises an application receiving device which receives applications for participation in the network game, a participation allowing device which allows players or characters used by the players related to the applications based on applications received by the application receiving device, a preliminary character recording medium which records preliminary characters which are not used by players, and a preliminary character participation enabling device which enables preliminary characters recorded in the preliminary character recording medium to participate in the network game when the number of applications allowed to participate does not reach a predetermined number of participants, the computer readable medium comprising:

a first processing routine for allowing players related to the applications or characters used by the players to participate in a network game based on applications for participation in the network game; and a second processing routine for enabling preliminary characters, which have been recorded in a preliminary character recording medium and have not been used by the players, to participate in the network game when the number of the applications for participation allowed in the first processing routine to participate in the network game is not sufficient to a predetermined number of applications for participation.

* * * * *